UNITED STATES PATENT OFFICE.

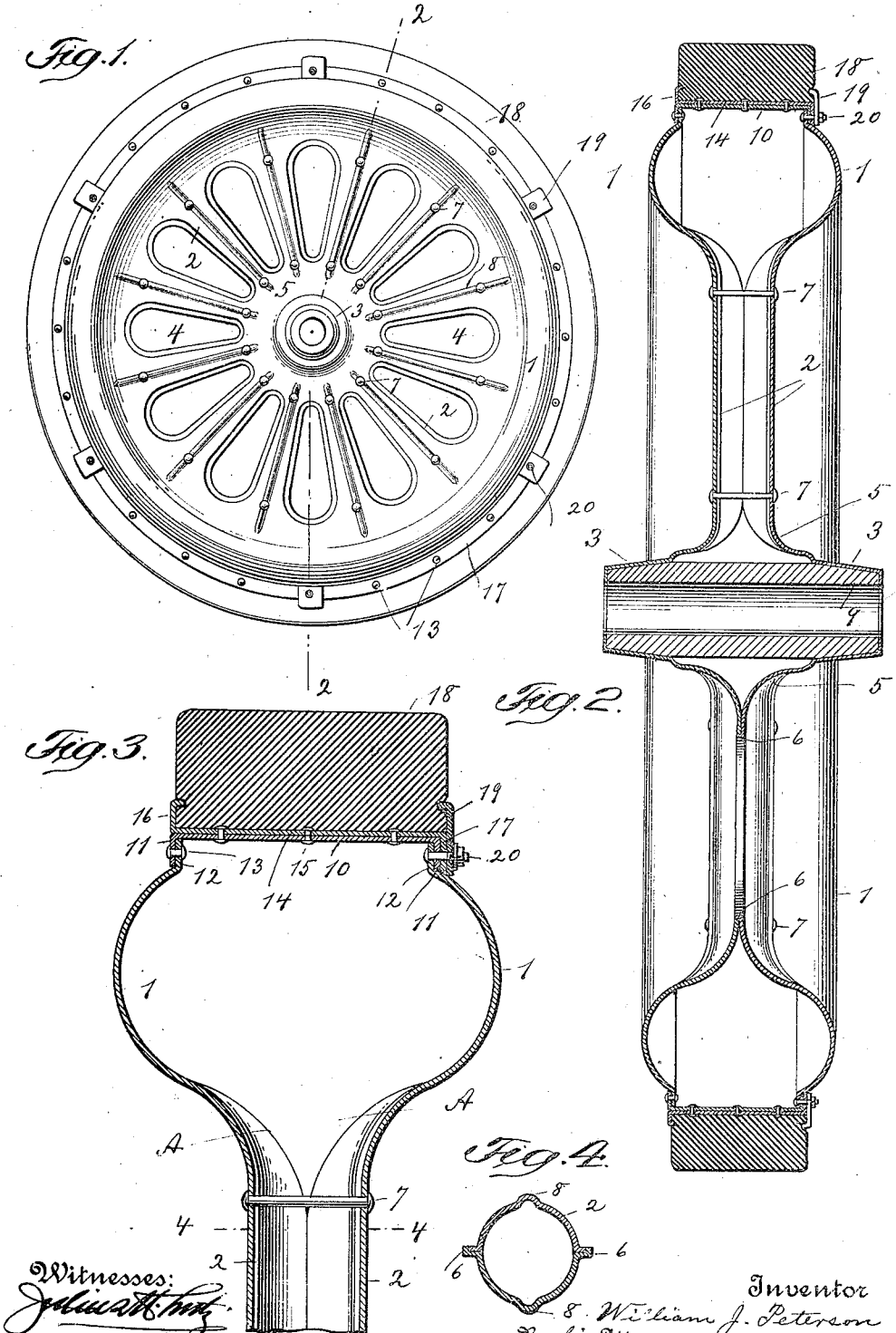

WILLIAM J. PETERSON, OF BROOKLYN, NEW YORK.

RESILIENT VEHICLE-WHEEL.

1,158,837. Specification of Letters Patent. Patented Nov. 2, 1915.

Application filed October 17, 1914, Serial No. 867,231. Renewed September 1, 1915. Serial No. 48,574.

*To all whom it may concern:*

Be it known that I, WILLIAM J. PETERSON, a citizen of the United States, and a resident of Brooklyn, in the county of Kings and State of New York, have invented certain new and useful Improvements in Resilient Vehicle-Wheels, of which the following is a specification.

This invention relates to a sheet metal wheel more particularly adapted for automobiles, and which is so constructed that the necessary resiliency is supplied within the wheel body, so that a solid tire may be used.

In the accompanying drawing: Figure 1 is a face view of a vehicle wheel embodying my invention; Fig. 2, an enlarged section on line 2—2, Fig. 1; Fig. 3, an enlarged section through the wheel rim and adjoining parts, and Fig. 4 a cross section on line 4—4, Fig. 3.

The body of the wheel is composed of two substantially equal complementary members or halves A, that face each other, and are formed preferably of sheet steel. Each member comprises a rim section 1, a spoke section 2, and a hub section 3, all made integral.

The rim section 1, is of pronounced size and is convexed or bulged outwardly so as to be resilient. The spoke section 2 is set well inward from the rim, and is provided with a plurality of radially extending openings 4, which divide off the several individual spokes, thus serving to impart lightness to the wheel. At their inner ends the spokes merge into an annulus 5 which is deflected laterally at right angles to form the semi-tubular hub section 3. One of the members A, is at each opening 4 provided with a flange 6, that extends over the corresponding edge of the other member, so as to form a weather proof lap joint therebetween. The two members constructed as described are permanently connected to each other by means of bolts 7, passing through the spokes, so that in this way a permanent union is effected. In order to reinforce the wheel, each spoke may be provided with a radially extending bead 8 which merges at its ends into rim 1, and annulus 5 respectively. Within the hub sections 3 is inclosed a bushing 9, for the reception of the axle.

The two rim sections 1 are curved inwardly or toward each other at the tread, and these inwardly turned ends are so spaced that the distance between them, is materially less than the distance between the extreme convex sections of the rim. Around these approaching outer ends of the rim sections there extends an inner ring 10, provided with flanges 11, that lap over corresponding flanges 12 of sections 1, and are bolted thereto as at 13. Upon this inner ring 10, there is seated an outer ring 14, riveted thereto as at 15, and having an outwardly extending flange 16 at one of its sides, and an inwardly extending flange 17 at the other side. A solid rubber tire 18 is fitted upon ring 14, and is removably secured thereto by flange 16 and by a number of clips 19 bolted to flange 17 at 20.

It will be seen that by the construction described, a solid sheet metal wheel is formed, the double convex rim of which is well adapted to impart the necessary resiliency to the structure. That is to say, as the tread of the wheel is set back from the widest portions of the convex rim, the load pressure, will have a tendency to bring into play an elastic action of such cheeks, so that in this way, a desirable resiliency is imparted to the structure. Furthermore as the resilient rim is integral with the sheet metal body of the wheel, this continuous play of the cheeks, can take place freely without in anywise exercising a disintegrating effect on the wheel body, the strain gradually diminishing toward the spokes that absorb the same.

The wheel can be cheaply manufactured, is of great strength, and permits a ready removal and replacement of the shoe.

I claim:

1. A vehicle wheel comprising a pair of sheet metal members each having a convex resilient rim section, and a spoke section integral with the rim section, the outer ends of the convex rim sections being curved inwardly, a ring secured to said inwardly curved ends, and a tire seated upon the ring.

2. A vehicle wheel comprising a pair of sheet metal members each having a convex resilient rim section, and a spoke section integral with the rim section, the outer ends of the convex rim sections being curved inwardly, flanges formed on said inwardly curved ends, an inner ring having flanges that overlap the rim flanges, bolts that connect the ring-flanges to the rim-flanges, an outer ring seated upon the inner ring, and having a flange at one of its edges, a tire seated upon the outer ring, and clips bolted to the outer ring and engaging the tire.

WILLIAM J. PETERSON.

Witnesses:
FRANK V. BRIESEN,
MADELINE HIRSCH.